United States Patent [19]
Yellowlees

[11] 3,935,064
[45] Jan. 27, 1976

[54] FUEL ASSEMBLY FOR GAS-COOLED NUCLEAR REACTORS

[75] Inventor: John Mackinlay Yellowlees, Brussels, Belgium

[73] Assignee: Belgonucleaire, Brussels, Belgium

[22] Filed: Apr. 5, 1973

[21] Appl. No.: 348,298

[30] Foreign Application Priority Data
June 19, 1972  Belgium .............................. 118875

[52] U.S. Cl. ..................... 176/73; 176/83; 176/61
[51] Int. Cl.² ........................................ G21C 3/16
[58] Field of Search ...................... 176/83, 73, 61

[56] References Cited
UNITED STATES PATENTS

| | | | |
|---|---|---|---|
| 3,070,537 | 12/1962 | Treshow .............................. | 176/83 |
| 3,184,392 | 5/1965 | Blake .................................. | 176/73 |
| 3,321,378 | 5/1967 | Thomson ............................. | 176/73 |
| 3,368,946 | 2/1968 | Jenssen .............................. | 176/83 |
| 3,389,054 | 6/1968 | Kovacic .............................. | 176/73 |
| 3,406,090 | 10/1968 | Dunn et al. .......................... | 176/73 |
| 3,801,450 | 4/1974 | Barthels et al. ...................... | 176/83 |

FOREIGN PATENTS OR APPLICATIONS

| | | | |
|---|---|---|---|
| 1,905,790 | 9/1969 | Germany ............................. | 176/73 |
| 1,464,740 | 9/1969 | Germany ............................. | 176/73 |

*Primary Examiner*—Harvey E. Behrend
*Attorney, Agent, or Firm*—Ostrolenk, Faber, Gerb & Soffen

[57] ABSTRACT

A fuel assembly for gas-cooled nuclear reactor: a wrapper tube within which are positioned a number of spaced apart beds in a stack, with each bed containing spherical coated particles of fuel; each of the beds has a perforated top and bottom plate; gaseous coolant passes successively through each of the beds; through each of the beds also passes a bypass tube; part of the gas travels through the bed and part passes through the bypass tube; the gas coolant which passes through both the bed and the bypass tube mixes in the space on the outlet side of the bed before entering the next bed.

9 Claims, 1 Drawing Figure

U.S. Patent   Jan. 27, 1976   3,935,064
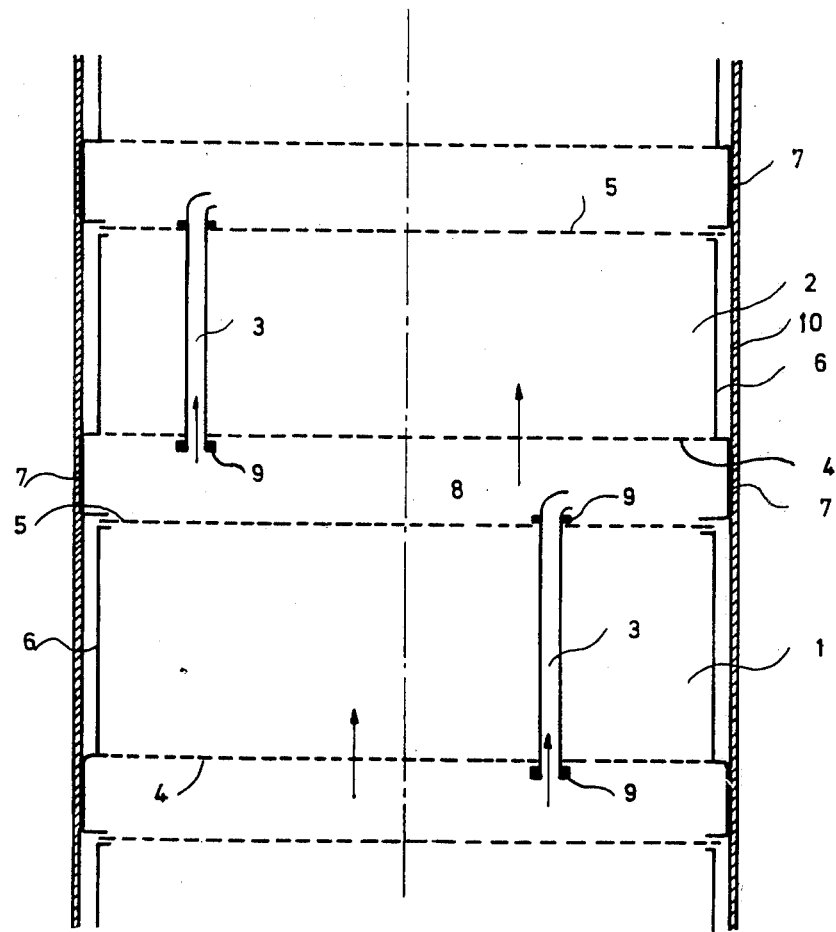

FUEL ASSEMBLY FOR GAS-COOLED NUCLEAR REACTORS

The present invention relates to fuel assemblies for nuclear reactors, and more particularly to assemblies for gas-cooled reactors.

It is known to use spherical particle fuel for this type of reactor. When using this type of fuel in gas-cooled fast neutron reactors, the particles, which consist of fissile and fertile material, coated with protecting layers, are piled up in a cylindrical space formed between two perforated tubes so as to form a long annular bed. The coolant gas passes through this bed or stack of particles via the perforations of the tubes.

This type of assembly, described in British Patent No. 1,213,557 for instance, has however fundamental disadvantages. As a matter of fact:

1. The bed of coated particles would be about 100 cm high and only 3 cm wide in a typical reactor. It is not certain that the inner and outer container tubes and the coated particles would withstand the axial and radial forces arising from friction between coated particles when the coated particles and the bed container tubes expand and contract during large changes in temperature.

2. The axial component of the bed lateral pressure drop would be opposite to the direction of gravitation forces for cores having upward coolant flow, causing thus a risk of separating the bed into sections by levitation and provoking flow bypass and thermal shock.

3. The diameter of each core element is fundamentally limited by the available pressure drop and it is found that in a typical reactor very many elements are needed.

4. There is no way of controlling the hot-spot temperature independently of the assembly temperature rise.

5. The available pressure drop across the bed varies with height and since it is undesirable to provide compensation by varying the effective coated particle volume with height, complicated other means are to be provided.

6. The assembly has axial coolant ducts which can lead to axial neutron streaming losses.

The present invention has for its object to propose a fuel assembly for gas-cooled nuclear reactors allowing to avoid the disadvantages of the known assemblies.

A further object of the invention is to provide a fuel assembly which meets certain design limitations as regards length, outlet gas temperature, maximum pressure drop, maximum hot-spot temperature and which provides adequate containment and protection of the coated fuel particles. The fuel assembly must also have a geometry which can be fabricated cheaply.

The assembly according to the invention comprises a wrapper tube or casing, inside said wrapper tube, a number of cylindrical beds containing spherical coated particle fuel, traversed by a vertical coolant flow and comprising tubes constituting by-passes for the coolant, which beds are superposed so as to form between them a space constituting a mixing zone for the gas coolant.

The spherical particle beds may all have the same height, or have different heights in function of their situation in the assembly, so that they can adapt themselves to the available local coolant pressure drop.

The assembly according to the invention allows to adjust the height of the bed to the available local pressure drop, avoids too thick particle stacks and thus the problems due to the friction of the particles on irradiation. This assembly moreover allows a higher fuel density in the core and a more precise control of the fuel temperature.

The invention will be described hereafter in more detail with the help of a non-limitative embodiment, under reference to the accompanying drawing, which represents a longitudinal schematic section of an assembly according to the invention.

The assembly comprises a wrapper tube 10 on its whole length, traversed from bottom to top, by the gas coolant. Inside the wrapper tube 10, are mounted in sequence 30 boxes, each being firmly attached to the wrapper tube. These boxes are parallel to each other and are traversed by vertical tubes 3. The boxes are of varying depth, the deepest at the bottom of the assembly and the shallowest at the top. Each box constitutes a spherical particle bed. 10-20 % of the coolant gas passes through each bed and the rest bypasses the bed through the tubes 3. The gas exiting out of the bed is at a high temperature and so the space 8 between the boxes is used as a mixing zone where the bed exit gas mixes with the cooler bypass gas producing gas at a mean temperature. This gas then enters the next bed in series. Any inadequacy of mixing in space 8 is corrected by further temperature mixing in the next bed in series.

The FIGURE represents two boxes or spherical particle beds 1 and 2. In each of the beds, the spherical particle fuel coated with protective layers is piled up between a lower perforated metallic plate 4 and an upper perforated metallic plate 5. Each box has sidewalls 6 welded or loosely attached to the lower perforated plate 4. The upper perforated plate 5 is held in axial position between the top of the sidewall and a projection 7 attached to the wrapper 10 and is therefore free to expand radially as its temperature increases. The wrapper 10 is maintained at the temperature corresponding to the mean temperature in the mixing space by allowing a bypass cooling flow (not illustrated) between the wrapper 10 and the sidewall 6. The bypass pipes 3 are loosely located in the upper and lower perforated plate by shoulders 9. Besides providing the passage for the bypass gas these pipes serve to strengthen the upper plate 5 against deformation resulting from the load due to the coolant pressure drop across the bed. The upper end of the pipe 3 is given a bend which directs the gas in a direction to cause vortex in the mixing space 8. This vortex serves to mix the gases issuing out of the bed of coated particles via the perforated plate 5 and out of the bypass pipes 3 so that gas at a mixed mean temperature is obtained for cooling the coated particles in the next box in the sequence. The vortex also serves to compensate for the effects of any radial rating gradient which would otherwise tend to make the temperatures on one side of the assembly significantly different from those on the other side. Besides reducing temperature hot-spots this reduces the thermal bowing of the wrapper tube.

The pressure drop generated within the bypass pipes 3 provides the necessary pressure head across the particle bed and the area of the bypass pipes 3 is adjusted so that the bed mass flow is correct. In this way it is possible to select any desired outlet temperature from the bed independently of the assembly overall outlet temperature. So it is possible to control the coolant hot-spot temperature independently of the assembly mixed mean outlet temperature. This is an important feature of the assembly.

The principal advantages of the fuel assembly according to this invention can be summarized as follows:

1. The coated particle beds are small in height so the problems due to ratcheting, jamming, etc... of the coated particles during thermal and irradiation induced expansions are likely to be eliminated.
2. Coolant flow bypasses cannot occur within the bed.
3. There is potential for a higher fuel volume fraction.
4. It is possible to control the hot-spot temperature independently of the assembly gas outlet temperature. This will lead either to higher gas outlet temperatures or to lower hot-spot temperatures at a given gas temperature.
5. There are no large axial coolant ducts that could lead to neutron streaming losses.
6. There is a constant mixed mean gas temperature at the upper perforated plate 5.

This mixing of hot and cold temperatures to produce the mixed mean temperature at the upper plate 5 can be done by the mixing of gases in the zone 8 as hereabove described or/and by mixing of the gases in the particle beds.

It is evident that the invention is not limited to the details and the embodiment described above, and that modifications can be introduced without leaving the general principle of the invention, i.e. fractionating the fuel into several individual beds, with coolant bypass tubes and superposed so as to form between them a mixing zone for the gas coolant.

Thus for example the coolant bypass tubes are not necessarily vertical tubes. Furthermore the gas flow may equally be directed from top to bottom, and the perforated upper plate can be constituted of another material, such as for instance ceramics.

I claim:

1. A fuel assembly for gas-cooled nuclear reactors, comprising:
   a wrapper tube;
   inside said wrapper tube is positioned a number of beds each said bed being defined above it and below it by spaced apart plates which permit gas coolant to pass therethrough; each said bed containing fuel comprised of coated particles; said beds are superposed in a stacked array and so as to form between neighboring said beds a space which defines a mixing zone for gas coolant; said beds extending across said wrapper tube and each sealing said wrapper tube;
   a bypass tube passing by each said bed and communicating between a said space that is above that said bed which it passes by and another said space that is below that said bed;
   whereby gas coolant flow is divided between a said bed and a said bypass tube.

2. Assembly according to claim 1, in which said assembly is arranged such that the coolant is caused to flow vertically therethrough.

3. Assembly according to claim 1, wherein said plates are perforated.

4. Assembly according to claim 1, in which each said tube extends from a said space beneath a said bed to a said space above that said bed.

5. Assembly according to claim 2, in which the upper end of each said bypass tube is bent within a said mixing zone to be directed generally across said zone.

6. Assembly according to claim 1, in which said beds have different heights.

7. Assembly according to claim 1, in which said beds are oriented parallel to each other.

8. Assembly according to claim 1, in which the upper end of each said bypass tube is bent within a said mixing zone to be directed generally across said zone.

9. Assembly according to claim 1, wherein said bypass tubes communicating into each said space are misaligned, thereby to facilitate thorough mixing in that said mixing zone.

* * * * *